March 24, 1931. D. J. STEWART 1,797,846
ELECTRIC HEAT CONTROL SYSTEM
Filed March 23, 1929
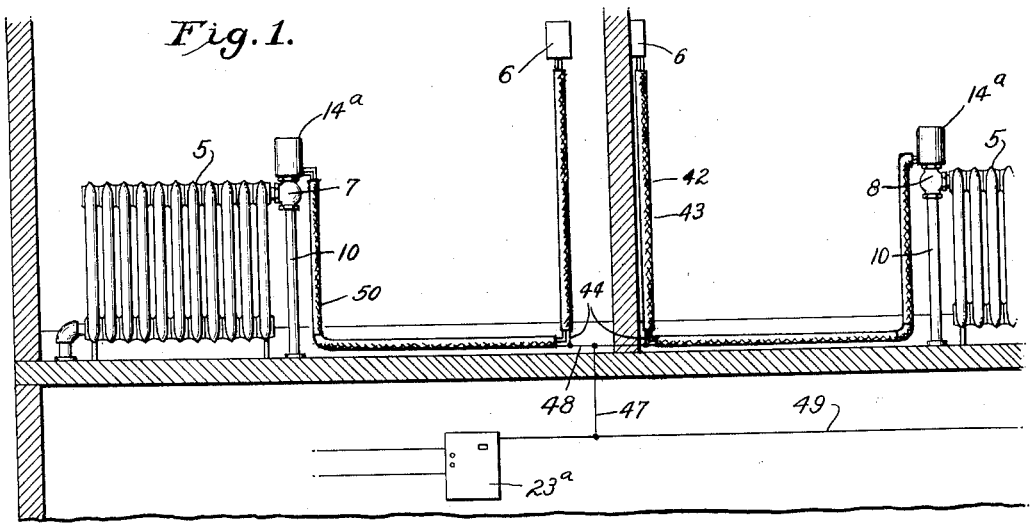
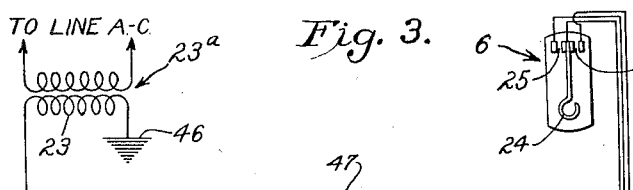
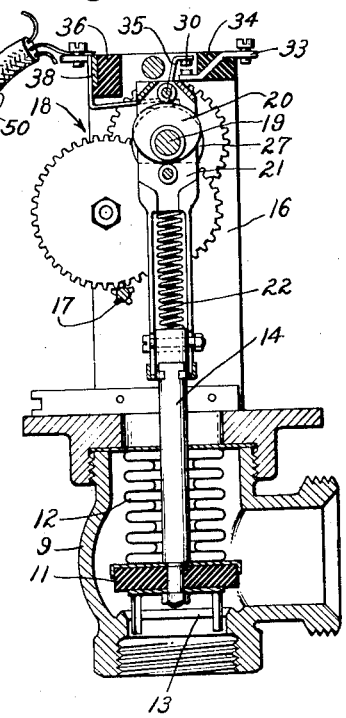
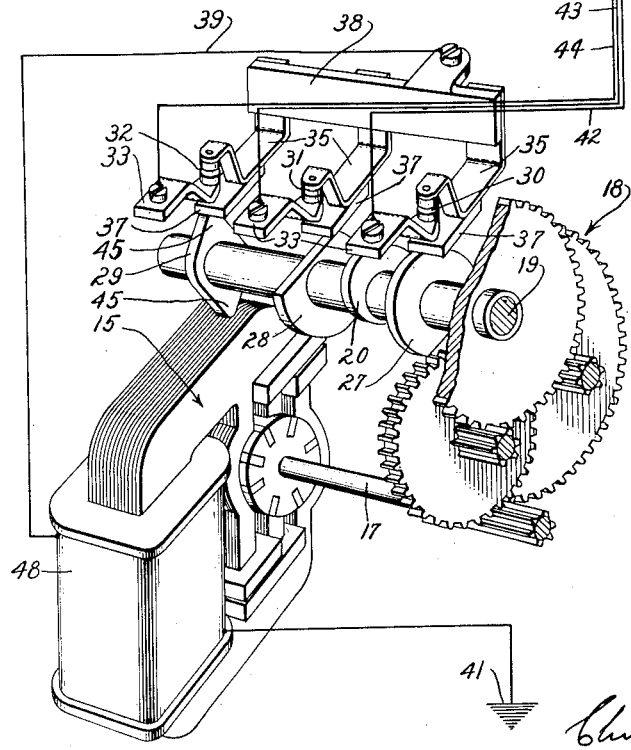
INVENTOR
Duncan J. Stewart
BY
ATTORNEYS Patented Mar. 24, 1931

1,797,846

UNITED STATES PATENT OFFICE

DUNCAN J. STEWART, OF ROCKFORD, ILLINOIS, ASSIGNOR TO HOWARD D. COLMAN, OF ROCKFORD, ILLINOIS

ELECTRIC HEAT-CONTROL SYSTEM

Application filed March 23, 1929. Serial No. 349,326.

This invention relates to improvements in electric heat control systems and more particularly to an air heating system in which the radiation of heat from radiators located in different rooms of a building are controlled by individual thermostats responsive to temperature changes in the rooms.

One object of the invention is to provide a system of the above character having individual electrically controlled operators for actuating heat control devices associated with the different radiators and incorporating an arrangement of the control circuits for said operators which is of novel and simplified character and which enables the heat control devices and operators to be installed readily and at a minimum cost both in old buildings and newly constructed buildings.

Other objects and advantages of the invention will become apparent from the following detailed description taken in connection with the accompanying drawings, in which Figure 1 is a sectional view of two rooms of a building equipped with a heating system embodying the features of the present invention.

Fig. 2 is a vertical sectional view of a fluid regulating valve and an operator therefor which may be utilized in the present system.

Fig. 3 is a perspective view of an operating unit for one of the heat control devices together with a schematic wiring diagram showing the control circuits.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form shown in the drawings the present invention is embodied in a heating system in which heated fluid such as steam or hot water is piped through radiators 5 located in different rooms of a building and in which the amount of heat given off to the surrounding air is governed by individual thermostats 6 located remotely from the radiators and responsive to temperature changes in the rooms. The thermostats act through the medium of power actuated control devices herein illustrated in the form of valves 7 and 8, whose casings 9 are interposed in the radiator inlet pipes 10. Each valve has a member 11 flexibly supported by a diaphragm 12 and arranged for axial movement toward and from a seat 13 by the reciprocation of a stem 14 projecting upwardly from the casing.

In the present instance the power operator for actuating the stem 14 to open or close the valve passageway is mounted on the valve casing within an enclosing cap 14ª and is arranged to be controlled electrically. Thus the operator may comprise a small electric motor 15 supported by a frame 16 with its shaft 17 connected by speed reducing gears 18 to a slow speed shaft 19. Fast on the shaft 19 is a cam 20 whose follower 21 has a pin and slot connection with the upper end of the stem 14 so that the valve may be seated with a pressure predetermined by a spring 22 interposed between the follower and the stem. It will thus be apparent that in successive half revolutions of the shaft 19 the follower 21 will be moved in opposite directions to move the valve member alternately toward and from the seat 13. By interrupting the operation of the motor the valve may be held either in open position (Fig. 2) to permit the flow of heating fluid into the radiator or in closed position to cut off the supply of heating fluid.

With the operator above described the motor 15 may be of the induction type so as to rotate unidirectionally when energized from a source of alternating current. To simplify the circuits by which each operator is controlled from its individual thermostat, it is preferred to operate the motor from a low voltage source of current such as may be delivered from the secondary coil 23 of a transformer 23ª whose primary is energized from the ordinary alternating current lighting circuit.

The operation of the motor to define successive valve opening and closing cycles of the operator is under the joint control of the thermostat 6 in the room where the operator is located and a mechanically operable switch mechanism incorporated in the motor unit. Herein the thermostat comprises a thermosensitive element 24 having a tongue carrying a contact which cooperates with two relatively stationary contacts to form two switches 25 and 26 which are closed selectively by the tongue depending on whether the room temperature is above or below a value predetermined by the setting of the thermostat.

In the present embodiment the switch mechanism above referred to includes three cams 27, 28 and 29 fast on the shaft 19 and arranged to control the opening and closing of three switches 30, 31 and 32 respectively. Each switch is formed by two contacts, one on an arm 33 stationarily mounted on an insulating block 34, the other being on a resilient spring arm 35 supported by a block 36 and tending to move toward the cooperating contact whereby to close its switch The spring arms 35 carry insulating pads 37 and constitute the followers for the different cams which, according to their angular positions on the shaft 19, hold their switches open or allow their switches to close in timed relation to the movement of the valve member 11.

All of the spring arms 35 are secured to a common metal bar 38 which is connected through the conducting wire 39 to one terminal end of the motor winding 40. The other winding terminal is grounded to the motor frame as indicated at 41 and therefore is electrically common to the metallic parts of the heating system.

The switch 30 cooperates with the thermostat switch 26 to control the starting of the motor in one of its valve operating cycles, for example the valve opening cycle, and therefore is electrically connected to the stationary contact of this switch by an insulated conductor 42 extending into the valve structure and attached to the arm 33 of the switch 30. The cam 27 is shaped to open the switch 30 shortly after the initiation of the valve opening cycle and to allow the switch to close prior to the completion of the valve closing cycle, thereby preparing the starting circuit for the opening cycle In a similar way the arm 33 for the switch 31 is connected by a conductor 43 to the stationary contact of the thermostat switch 25 which initiates the valve closing cycle. The cam 28 is adapted to open the switch 31 in the initial part of the valve closing cycle and to allow the same to close in the latter part of the valve opening cycle.

An independent circuit is provided to carry the motor current for the major portion of each cycle in order to prevent flashing at the thermostat contacts and thereby prolong the life of the sensitive switches formed by these contacts. This circuit is controlled by the switch 32, the stationary contact of which is connected by an insulated conductor 44 to the tongue or movable contact of two thermostat switches. The cam 29 has two lobes 45 which are so shaped and so disposed relative to the cams 27 and 28 as to allow the switch 32 to close shortly after the initiation of each cycle and to open the switch and terminate the cycle when the valve member 11 has reached its open or closed position.

Current is supplied to the motor winding 48 by closure of any of the three circuits above mentioned. For this purpose one terminal of the transformer secondary 23 is grounded as indicated at 46 to the piping of the heating system and its other terminal is connected by an insulated conductor 47 either to the common contact of the two thermostat switches or to the conductor 44 at any convenient point between the thermostat and the valve operator. Thus the conductor 47 is interposed in series with the switch 32 controlling the main or running circuit of the operator and through the medium of the thermostat switches 25 and 26 is made electrically common to both of the starting circuits controlled by these switches.

The control circuits function in the following manner in the execution of the valve closing cycle, the switches 30 and 32 being open and the switch 31 being closed when the shaft 19 is in valve-opened position as shown in Fig. 3.

As the temperature in the room rises the thermal element 24 moves to close the switch 25 thereby completing a starting circuit from the secondary 23 through conductors 47 and 44, the switch 25, conductor 43, switch 31, plate 38, conductor 39, the winding 40 to the other side of the secondary 23. This initiates the operation of the motor to move the valve member toward its seat and shortly thereafter the cam 29 allows the switch 32 to close thereby completing the main circuit through the winding 40, conductors 47 and 44, switch 32 and the conductor 39. As soon as this circuit is established the switch 31 is opened. The motor continues to run until the running circuit is opened by the cam 29, the valve member being stopped in seated position. By this time the switch 30 will have been allowed to close thereby preparing the other starting circuit for the next operating cycle which is controlled by the thermostat switch 26.

With the particular arrangement of control circuits above described, the number of wires required and the cost of installing the operator is reduced to a minimum. Such reduction in the number of wires results from the connection of one terminal end of the motor winding 40 directly to one terminal of each of the contact switches 30, 31, and 32.

This connection can be made wholly within the motor unit and enables the power lead 47 to be connected at a point externally of the motor unit to the wire 44 which terminates at the thermostat contact which is common to both starting circuits. By grounding the other end of the winding current will be supplied to the motor without the extension of any other conductor into the motor unit.

While only three insulated wire conductors are required in the present instance between the thermostat and the operator, it will be observed that one of these would be eliminated where the main or running circuit is omitted. In this event the current for the entire cycle of the operator would be carried by the thermostat switch controlling such cycle and a more ruggedly constructed thermostat would be required.

It will be observed that the conducting wires 42, 43 and 44 extend uninterruptedly from the motor unit to the thermostat and therefore are of equal lengths. This arrangement is particularly advantageous in that it permits the wires to be enclosed in a tubular sheath or covering 50 composed of metal or fabric and forming with the wires a flexible cable which may be strung as a single wire about the room as may be required by the relative locations of the radiator and thermostat. Installation of the wiring is thereby greatly facilitated. Such a cable presents a neat appearance when exposed to view as would ordinarily be the case when the present system is installed in old buildings.

Figure 1 illustrates the simplification of wiring resulting from the fact that the power lead wire for each operator may be attached at any point along the conductor 44 or at the common thermostat terminal so that all or part of the latter conductor may be utilized to carry current to the operator. Thus to supply power to the operators for the radiators in two rooms it is merely necessary to join adjacent portions of the conductors 44 of the two cables as by means of a wire 48 to which the power lead 47 from the main power line 49 is attached. Or, if more convenient by reason of the location of the thermostats of two rooms adjacent each other, the common thermostat terminals may be connected directly and the power conductor 47 connected to one of such terminals or extended into the operator casing depending on the positions of the thermostat and operator relative to the power line in the given instance. In this way, the length of the power conductors required to be extended throughout the building is reduced to a minimum and the cost of installing the system as a whole substantially decreased.

The valve operator disclosed herein forms the subject matter of and is claimed in my copending application Serial No. 378,118 filed July 13, 1929 and in an application by Howard D. Colman and myself Serial No. 417,989 filed January 2, 1930.

I claim as my invention:

1. In an air heating system having a plurality of radiators each having a device for governing the radiation of heat therefrom, a plurality of power operators, one for each heat control device and including an electric motor, a plurality of thermostats, one for controlling each operator and having two switches with an electrically common terminal, three continuous wires extending from each operator to its controlling thermostat and enclosed in a single tubular covering, two of said wires being connected respectively to the independent terminals of said switches, two switches connected respectively to the other ends of said last mentioned wires and arranged to be actuated by the motor of the associated operator, said last mentioned switches being insulated from said operator and having a common terminal connected to the motor winding of the operator, a third switch connected to said winding and arranged to be actuated by the motor in each operating cycle of said operator to terminate such cycle, the third of said wires connecting said last mentioned switch and said common thermostat terminal, a source of current connected to the motor windings of all of said operators, and a conductor connecting said third mentioned wire of a plurality of said operators whereby to form a power line formed in part by the wires of the different operators, said power line being connected to said source of current.

2. In an air heating system having a plurality of radiators each having a device for governing the radiation of heat therefrom, a plurality of power operators one for each heat control device and including an electric motor, a plurality of thermostats one for controlling each operator and having two switches with an electrically common terminal, two switches associated with each operator and arranged to be actuated thereby to control alternate cycles of operation thereof, one terminal of said last mentioned switches being electrically common and connected to the winding of said motor, two wires extending between each operator and its controlling thermostat and each connecting one of said operator switches to the independent terminal of one themostat switch, a source of electric current connected by uninterrupted conductors to the motor windings of the different operators, and a conductor connecting the common terminal of all of said thermostats together and to said source of current.

3. In a heating system having a radiator to which heated fluid is conducted through metallic piping, the combination of a valve device associated with and operable to control the radiation of heat from said radiator, a power operator for said device, including an electric motor having an energizing winding grounded to said piping, a shaft driven in unison with said device, a casing enclosing said operator, three insulated switches within said casing arranged to be controlled by said shaft, one being rendered operative in each valve operating cycle to terminate the operation of the motor, said other switches being operable in alternate cycles to start the motor, means within said casing connecting each of said switches directly to the ungrounded terminal of said winding, a multiple wire cable extending at one end into said casing and having three wires connected respectively to said switches, a thermostat having two selectively operable switches with a common terminal, the other end of said cable terminating adjacent said thermostat with its wires connected to the three elements of said thermostatic switches, the wire thereof connected to said first mentioned switch being connected to said common terminal, and a source of electric current connected to the piping of said system and to said last mentioned wire at a point exteriorly of said casing.

4. In an air heating system having a plurality of radiators to which heating fluid is conducted through metallic piping, a plurality of valve devices, each operable to control the radiation of heat from one of said radiators, a power operator for each of said devices including an electric motor having an energizing winding with one terminal grounded to said piping, a plurality of thermostats one controlling each operator and having two switches with an electrically common terminal, a pair of switches associated with each operator and having a common terminal connected to the insulated terminal of the motor winding, two insulated conductors connecting the independent terminals of said last mentioned switches to the independent terminals of the controlling thermostat, a source of electric current having one terminal grounded to said piping, and means connecting the other terminal of said power source to the common terminal of the different thermostats.

In testimony whereof, I have hereunto affixed my signature.

DUNCAN J. STEWART.